(12) United States Patent
Shirsale et al.

(10) Patent No.: US 11,692,651 B2
(45) Date of Patent: Jul. 4, 2023

(54) COUPLER WITH NON-METALLIC CONDUCTIVE GASKET

(71) Applicant: Eaton Intelligent Power Limited, Dublin (IE)

(72) Inventors: Govinda A. Shirsale, Maharashtra (IN); Michael DeMuth, Thornton, CO (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 258 days.

(21) Appl. No.: 16/216,109

(22) Filed: Dec. 11, 2018

(65) Prior Publication Data

US 2019/0178425 A1 Jun. 13, 2019

Related U.S. Application Data

(60) Provisional application No. 62/597,967, filed on Dec. 13, 2017.

(51) Int. Cl.
*F16L 21/06* (2006.01)
*F16L 25/01* (2006.01)
(Continued)

(52) U.S. Cl.
CPC .............. *F16L 17/00* (2013.01); *F16L 21/06* (2013.01); *F16L 25/01* (2013.01); *F16L 25/12* (2013.01)

(58) Field of Classification Search
CPC . F16L 17/00; F16L 25/01; F16L 23/04; F16L 25/12; F16L 58/00; F16L 17/02;
(Continued)

(56) References Cited

U.S. PATENT DOCUMENTS 4,881,760 A * 11/1989 Runkles ................... F16L 23/04
5,480,193 A * 1/1996 Echols .................... F16L 21/06
(Continued)

FOREIGN PATENT DOCUMENTS

CN        1247286 A    3/2000
CN    102132079 A    7/2011
(Continued)

OTHER PUBLICATIONS

FR1872837 French Searh Report, dated Jun. 11, 2020.
(Continued)

*Primary Examiner* — Zachary T Dragicevich
*Assistant Examiner* — William S. Choi
(74) *Attorney, Agent, or Firm* — Merchant & Gould P.C.

(57) ABSTRACT

A coupler for connecting a first fluid conveying member and a second fluid conveying member includes a first coupler half, a second coupler half, and a conductive gasket. In embodiments, at least one of the first coupler half and the second coupler half include an annular groove configured to receive at least a portion of the conductive gasket; the conductive gasket comprises non-metallic material, the first coupler half and the second coupler half are configured to connect and circumferentially surround portions of said first and second fluid conveying members, and the conductive gasket provides a portion of a conductivity path from a first end of the coupler to a second end of the coupler, and may be part of a conductivity path from a first fluid conveying member to a second fluid conveying member. Embodiments of a non-metallic conductive gasket and methods of making a coupler assembly are also disclosed.

25 Claims, 11 Drawing Sheets

(51) Int. Cl.
*F16L 25/12* (2006.01)
*F16L 17/00* (2006.01)

(58) Field of Classification Search
CPC ......... F16L 17/025; F16L 17/06; F16L 21/02;
F16L 21/06; F16L 23/22; F16L 9/125;
F16L 25/02; F16L 25/026; F16L 37/0842;
F16L 37/088; F16L 37/0885
USPC ....... 285/335, 910, 236, 344, 345, 337, 364,
285/379, 406, 419, 420, 421
See application file for complete search history.

(56) References Cited

U.S. PATENT DOCUMENTS

| | | | | |
|---|---|---|---|---|
| 5,581,019 | A | * | 12/1996 | Minor ........................... 285/910 |
| 6,073,973 | A | * | 6/2000 | Boscaljon ............... F16L 25/01 |
| 9,162,774 | B2 | | 10/2015 | Minteer et al. |
| 9,261,211 | B2 | | 2/2016 | Schooley et al. |
| 10,309,570 | B2 | | 6/2019 | Gonzalez Bayon et al. |
| 2009/0322078 | A1 | | 12/2009 | Wern et al. |
| 2014/0008911 | A1 | * | 1/2014 | Hartmann ............... F16L 21/06 |
| 2014/0021719 | A1 | * | 1/2014 | Salehi-Bakhtiari |
| 2015/0176728 | A1 | * | 6/2015 | Bowman ............... F16L 37/088 |
| 2015/0260324 | A1 | * | 9/2015 | Raper |

FOREIGN PATENT DOCUMENTS

| | | |
|---|---|---|
| CN | 103482076 A | 1/2014 |
| CN | 104728542 A | 6/2015 |
| CN | 204420349 U | 6/2015 |
| CN | 105829788 A | 8/2016 |
| DE | 102007011607 A1 | 9/2008 |
| EP | 2672156 A1 | 12/2013 |
| FR | 2674072 A1 * | 9/1992 |
| GB | 1356995 A | 6/1974 |
| GB | 1503055 A | 3/1978 |
| WO | 00/08369 A1 | 2/2000 |
| WO | 08/107118 A1 | 9/2008 |

OTHER PUBLICATIONS

Chinese Office Action 201811525544.4, dated Jul. 21, 2021 with English Translation.
Chinese Office Action 201811525544.4, dated Jan. 12, 2022, with English Summary.

* cited by examiner

COUPLER WITH NON-METALLIC CONDUCTIVE GASKET

CROSS-REFERENCE TO RELATED APPLICATION

This application claims the benefit of U.S. Provisional Patent Application Ser. No. 62/597,967, filed on Dec. 13, 2017, the disclosure of which is hereby incorporated herein by reference in its entirety.

TECHNICAL FIELD

The present disclosure generally relates to coupling assemblies and couplers for connecting fluid conveying members or conduits, including couplers having a non-metallic conductive gasket.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Couplers are used to connect fluid conveying members, such as tubes or conduits, across a fluid transport system. A fluid transport system commonly includes tubes connected together for moving fluid through the tubes. As used herein, a "fluid" may comprise any number of liquids and/or gases. Fluid transport systems may be used, for example to transport any number of fluids within vehicles, including, without limitation, automobiles or aircraft. For example, threadless couplers have been developed to connect ducts or fuel lines carrying fuel and other fluids throughout an aircraft.

Such couplers and most of the sub-components are commonly made of metal, such as aluminum or steel. Traditional couplers employ metallic components to meet electrical conductivity requirements, such as in connection with fuel line applications. For fluid conveying members that convey fuel, there may be a concern that the design can adequately dissipate electrostatic charges that may build up between insulated sections of coupled conveying members. That is, fuel tubes comprised of plastic and/or metal materials may be susceptible to a buildup of electrostatic charge. A buildup of electrostatic charge with a fuel tube may be caused by a number of different factors including, but not limited to, the flow of a fluid through a fuel tube. When an electrostatic charge builds up on a surface of a fuel tube, the fuel tube can be prone or susceptible to electrical discharge of the electrostatic charge. As such, some conventional solutions may involve the use of an electrical jumper, or bonding jumper, which can provide an electrically conductive connection between coupled members.

There is an interest in couplers that are lighter weight, contain fewer components, provide for efficient assembly and uses, and do not sacrifice performance, including handling of charge transfer.

There is a desire for solutions/options that address or eliminate one or more challenges or shortcomings of current couplers. The foregoing discussion is intended only to illustrate examples of the present field and should not be taken as a disavowal of scope.

SUMMARY

A coupler for connecting a first fluid conveying member and a second fluid conveying member includes a first coupler half, a second coupler half, and a conductive gasket. In embodiments, at least one of the first coupler half and the second coupler half include an annular groove configured to receive at least a portion of the conductive gasket; the conductive gasket comprises non-metallic material, the first coupler half and the second coupler half are configured to connect and circumferentially surround portions of said first and second fluid conveying members, and the conductive gasket provides a portion of a conductivity path from a first end of the coupler to a second end of the coupler, and may be part of a conductivity path from a first fluid conveying member to a second fluid conveying member. Embodiments of a non-metallic conductive gasket and methods of making a coupler assembly are also disclosed.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

An embodiment of a coupler 10 that may be used to connect fluid conveying members is generally illustrated in FIGS. 1-4. In embodiments, such as illustrated, the coupler 10 may be a concentric slide clamshell-type coupler, which may include a pair of coupler halves that are joined or connected, such as via a hinge.

Figure 1:
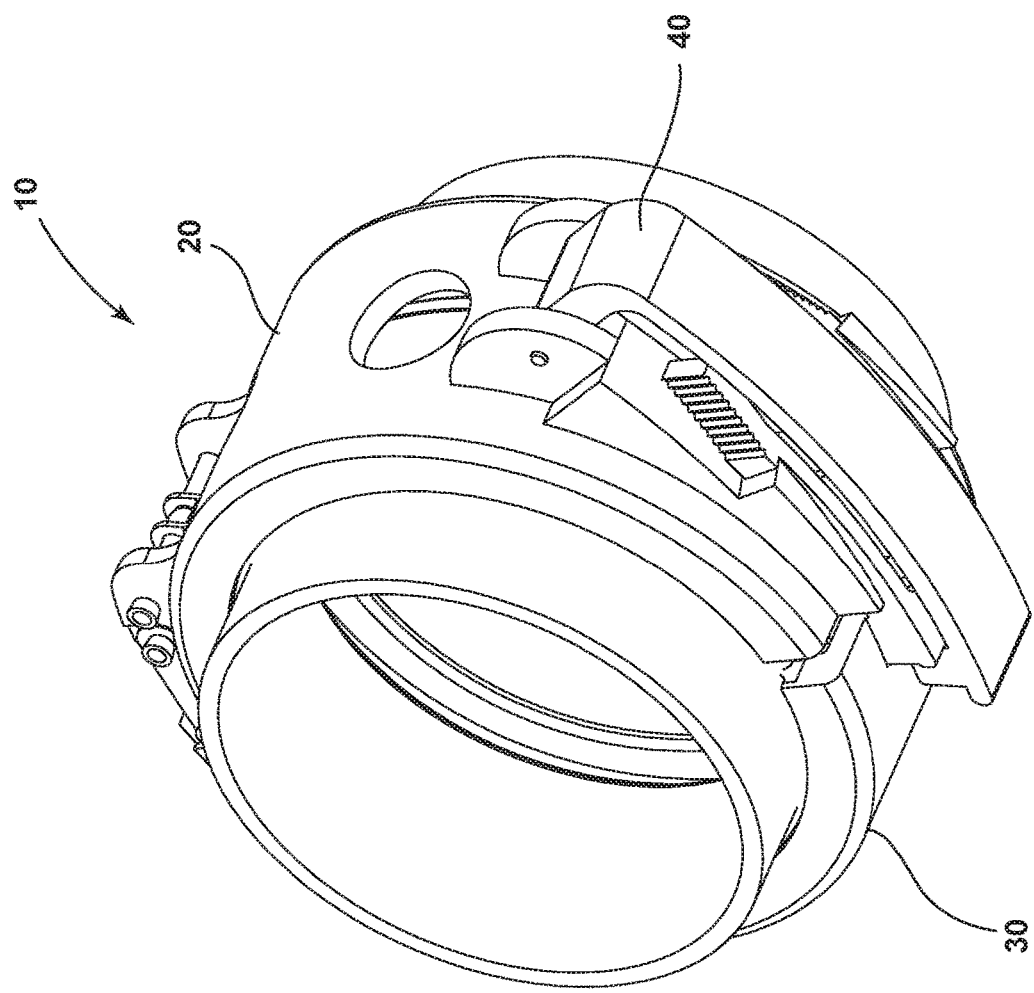
FIG. 1 is a perspective view generally illustrating an embodiment of a coupler according to teachings of the present disclosure.
Figure 2:
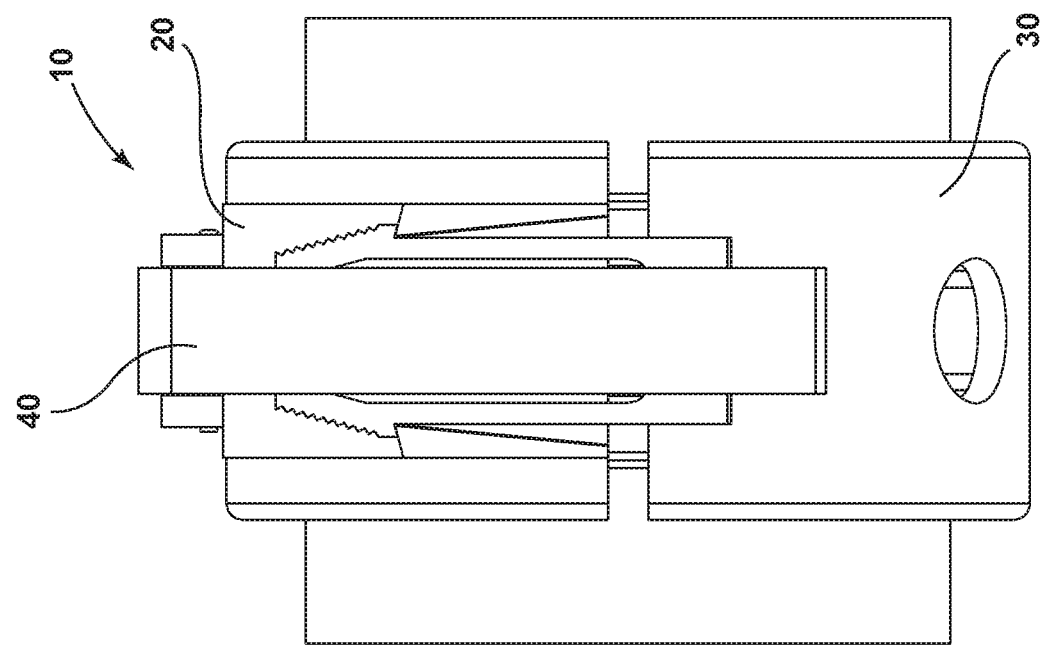
FIG. 2 is side elevation view of a coupler as generally illustrated in FIG. 1.
Figure 3:
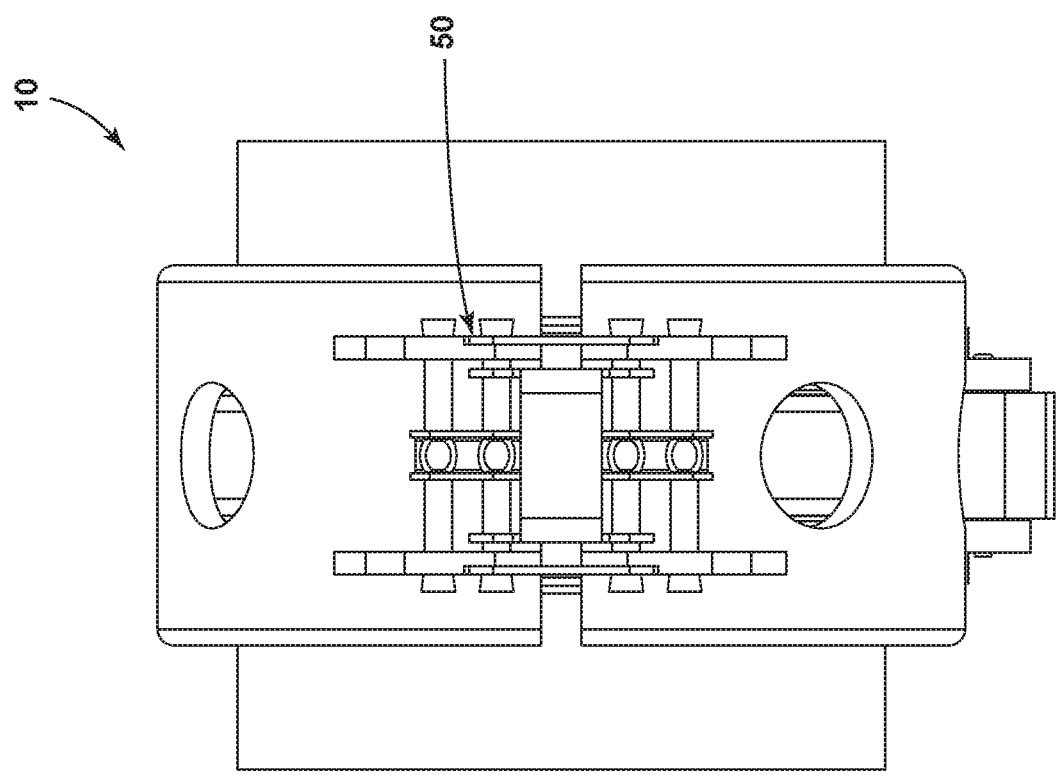
FIG. 3 is another side elevation view of a coupler as generally illustrated in FIG. 1.
Figure 4:
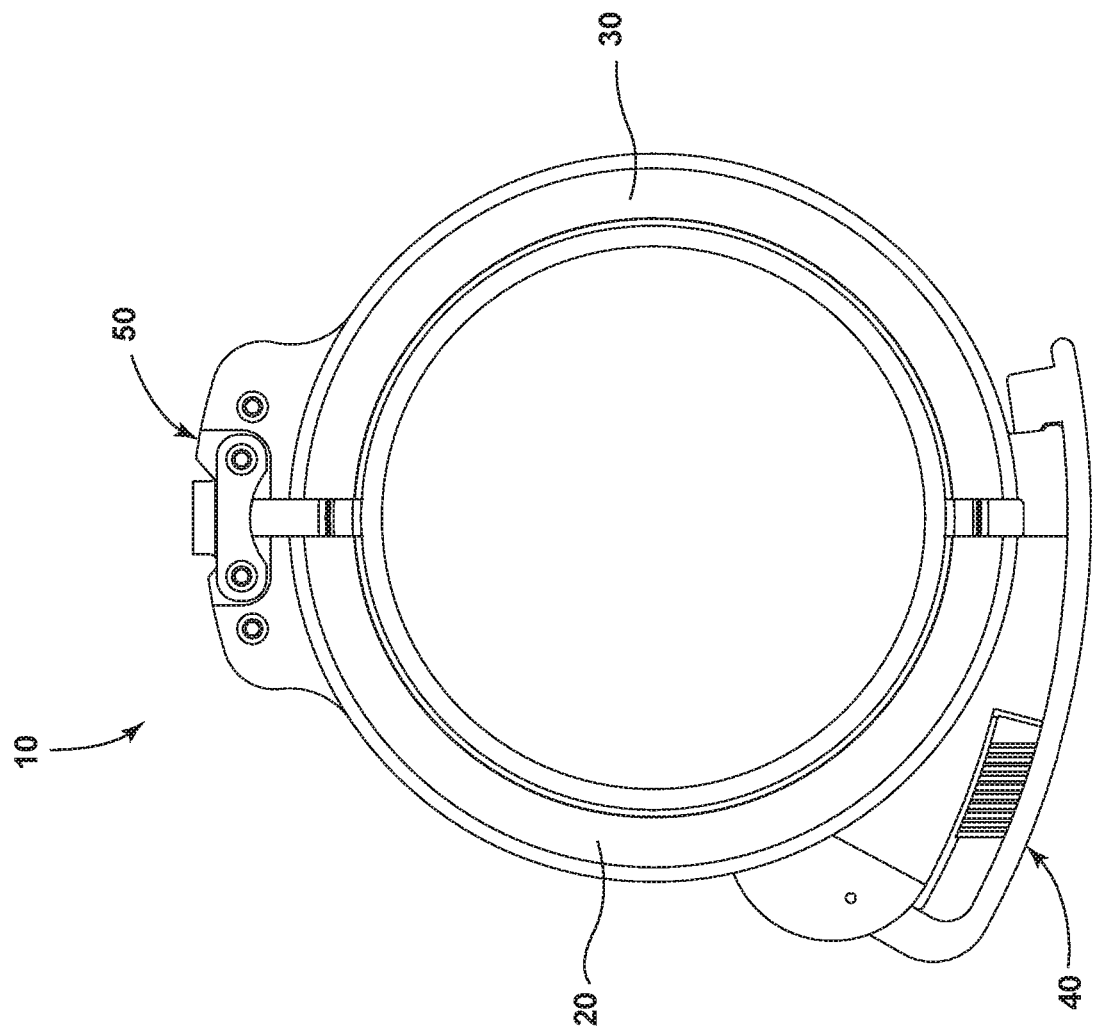
FIG. 4 is a top plan view of a coupler as generally illustrated in FIG. 1.

As generally illustrated in FIGS. 1 and 2, an embodiment of a coupler 10 may include two coupler halves 20, 30 that may be connected and retained in a connected configuration via a latch 40. FIG. 3 generally illustrates an embodiment of a hinge (or hinge assembly) 50 that may join or connect the coupler halves. FIG. 4 generally illustrates a top plan view of an embodiment of a coupler 10 having a latch 40 and a hinge 50.

Figure 5:
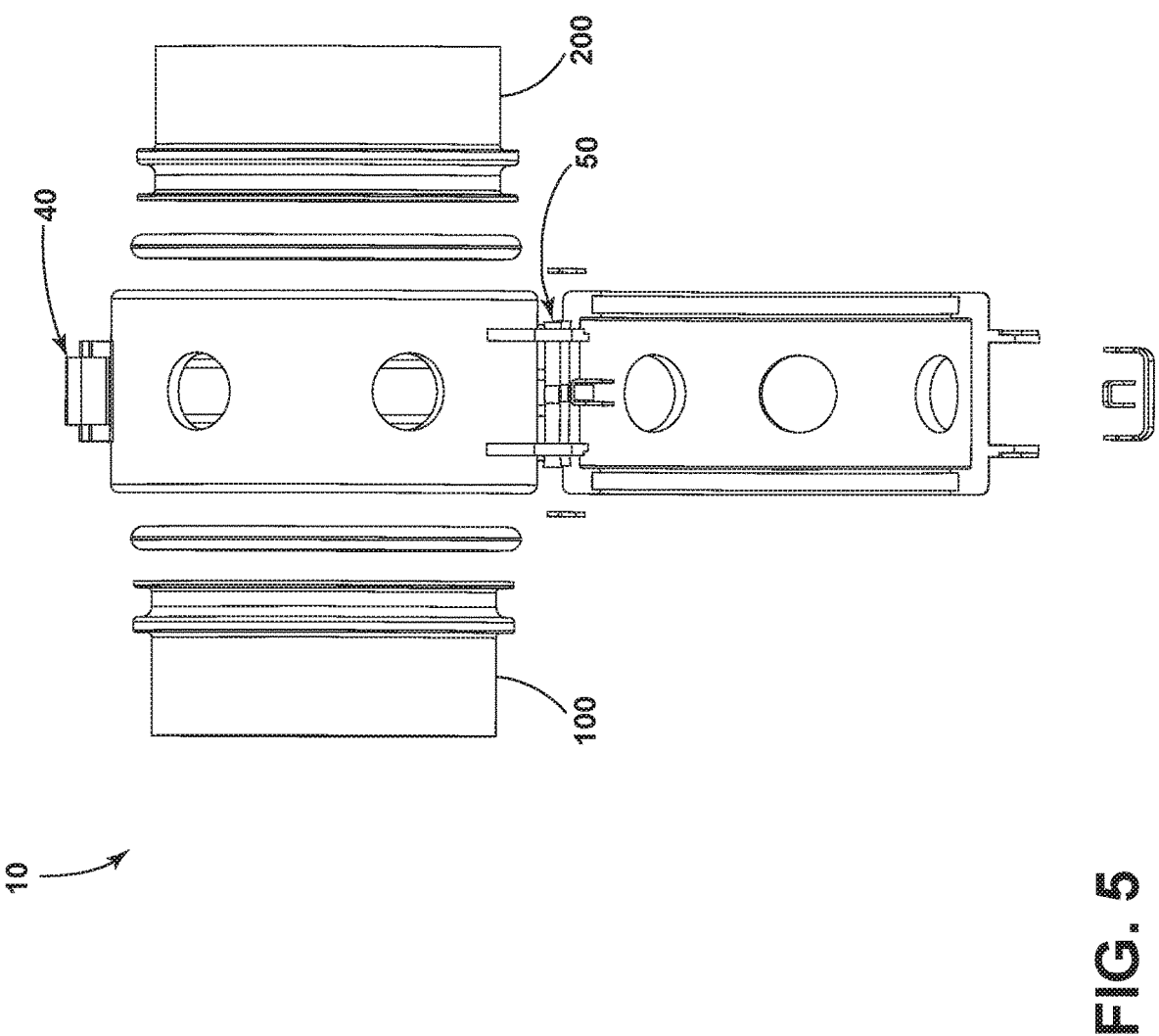
FIG. 5 is side elevation view of an embodiment of a coupler, such as generally illustrated in FIG. 1, shown in an open configuration with portions of two fluid conveying members.
Figure 5A:
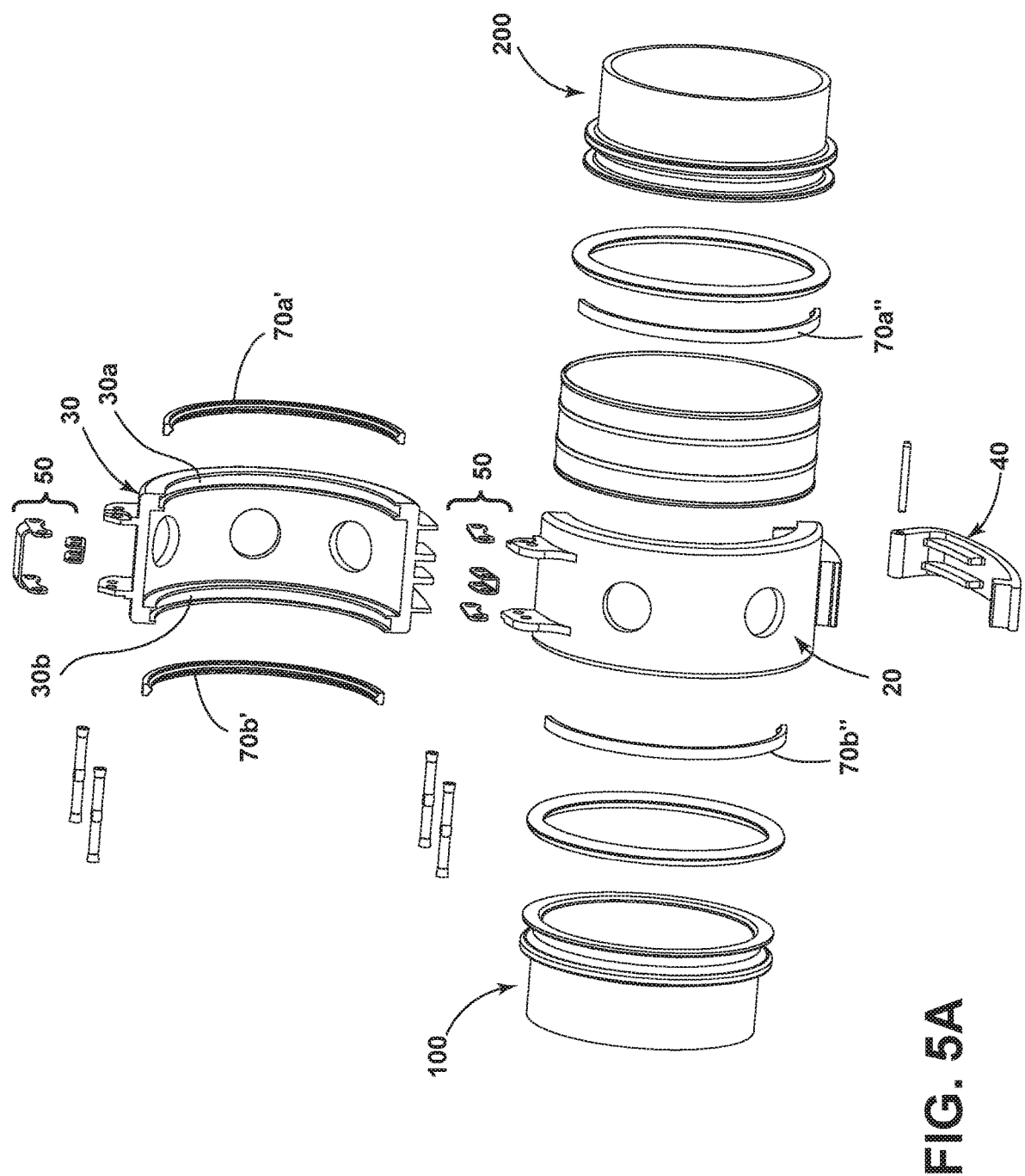
FIG. 5A is an exploded view of an embodiment of a coupler according to teachings of the present disclosure.
Figure 6:
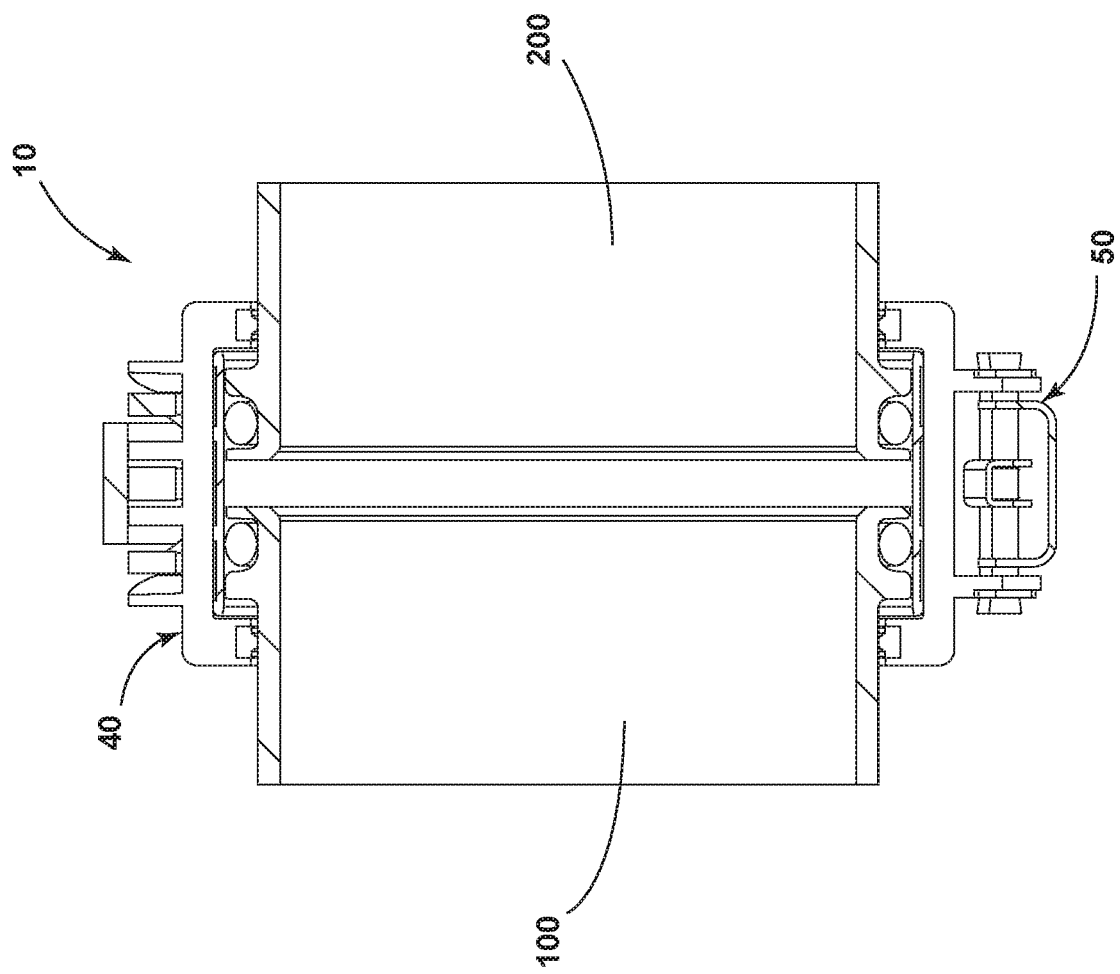
FIG. 6 is cross-sectional side elevation view of an embodiment of a coupler, such as generally illustrated in FIG. 1, shown in an engaged configuration with portions of two fluid conveying members.

FIG. 5 generally illustrates an embodiment of a coupler 10, such as generally illustrated in FIGS. 1-4, shown in a partially split or open configuration. FIG. 5A generally shows an exploded view of the components associated with an embodiment of a coupler. The illustrated coupler 10 may be used to connect portions of two fluid conveying members 100, 200. FIG. 6 generally illustrates an embodiment of a coupler 10 according to the present disclosure that is shown connecting two fluid conveying members 100, 200 in a connected or closed configuration.

Figure 7B:
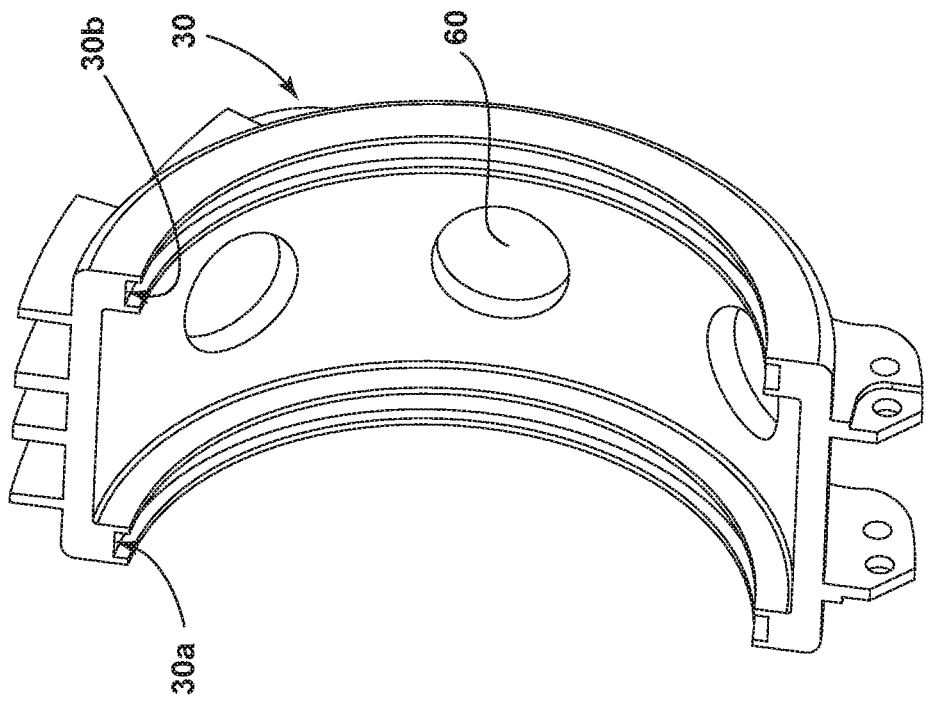
FIGS. 7A and 7B are perspective views of an embodiment of coupler halves according to teachings of the present disclosure.
Figure 7A:
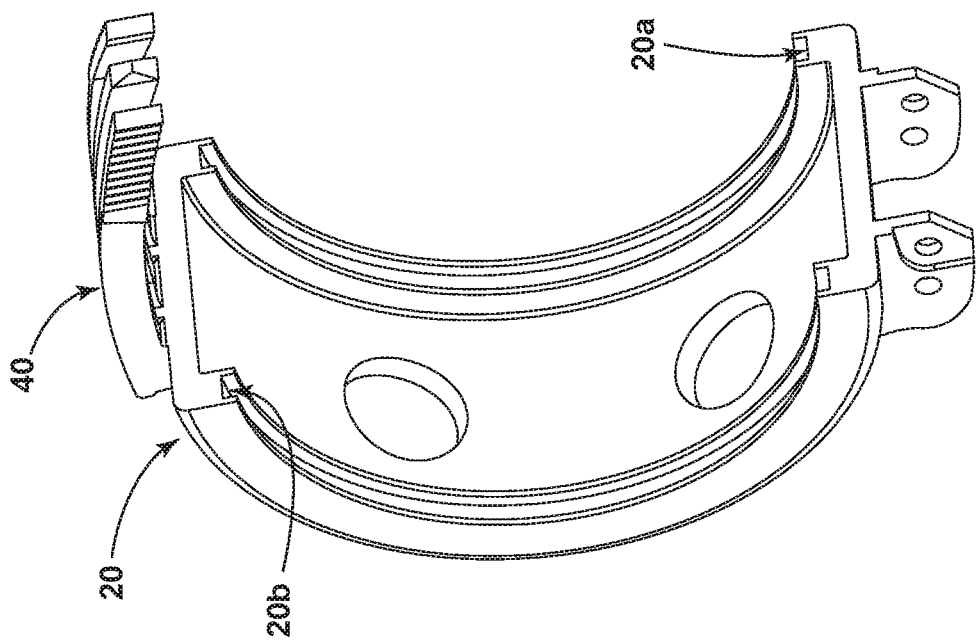

With reference to FIGS. 7A and 7B, embodiments of a first coupler half 20 and a second coupler half 30, are respectively shown. As generally illustrated, interior circumferential portions of each of the coupler halves 20, 30 may include annular grooves, such as generally designated 20a and 20b (with first coupler half 20) and 30a and 30b (with second coupler half 30). In embodiments, annular groove 20a of first coupler half 20 may correspond with annular groove 30a of second coupler member 30 to form a substantially continuous annular groove. In a similar manner, annular groove 20b of first coupler half 20 may correspond with annular groove 30b of second coupler member 30. The annular grooves may be provided or disposed at or about opposing edges of the coupler halves. For example, annular grooves 20a and 30a may be provided about a first end of coupler 10, and annular grooves 30a and 30b may be provided about a second end of coupler 10. With embodiments, portions of the coupler halves 20, 30 may be configured to engage and capture or retain annular flanges provided in connection with the associated fluid conveying members 100, 200.

In embodiments, one or more apertures 60 may be included and provided around portions of the first and second coupler halves 20, 20. Such apertures 60 may, among other purposes, provide for a decrease in material while providing a view with respect to portions of the fluid conveying members and the connection thereof.

Figure 8B:
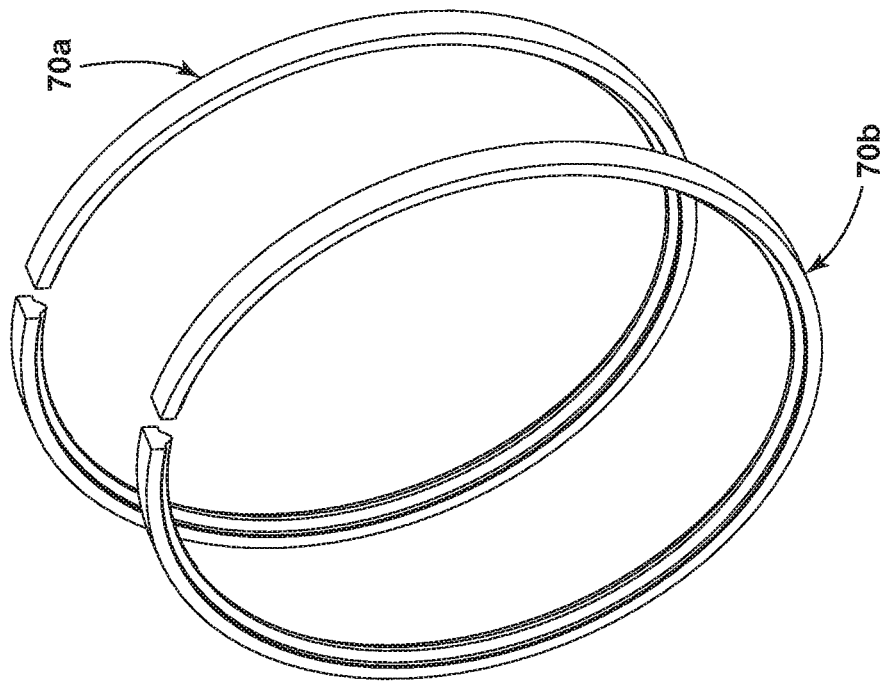
FIGS. 8A and 8B are perspective views of an embodiment of a pair of conductive gaskets according to teachings of the present disclosure.
Figure 8A:
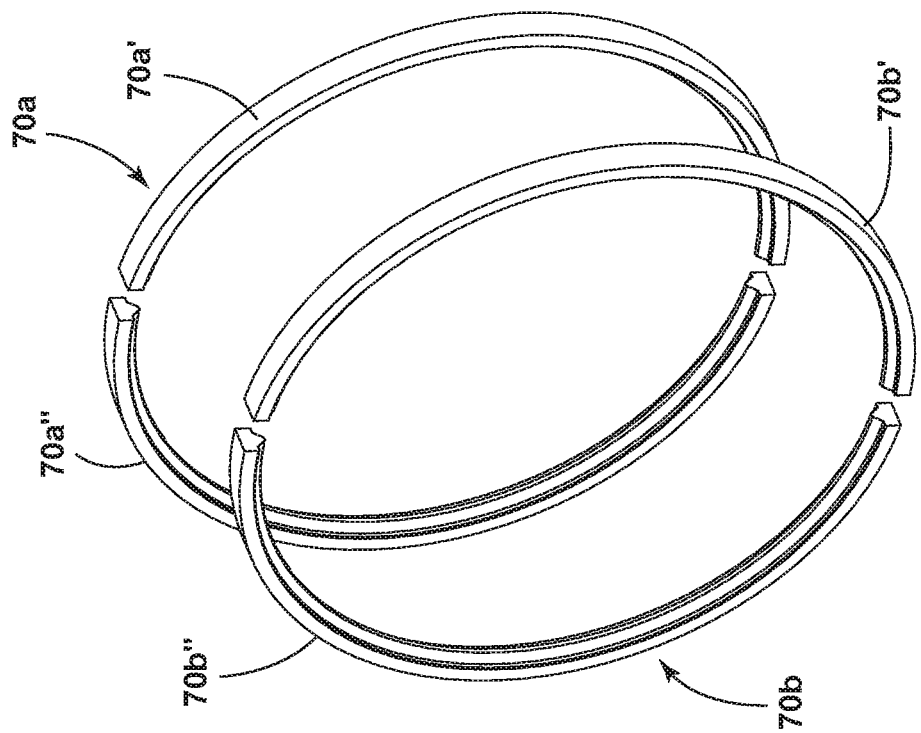

FIG. 8A generally illustrates and embodiment of a pair of conductive gaskets 70a, 70b that may be used in connection with a coupler 10 according to the present disclosure. In such an embodiment (which may be referred to as a "four-piece" gasket design), conductive gasket 70a may comprise two separate segments 70a' and 70a" and those two segments may, for example, be at least partially disposed within annular grooves 20a and 30a, respectively. Similarly, two separate segments 70b' and 70b" may, for example, be at least partially disposed within annular grooves 20b and 30b, respectively. In embodiments, one end of the separate segments may be positioned to coincide with the portion of the coupler 10 that is open in an open configuration.

FIG. 8B generally illustrates another embodiment of a pair of conductive gaskets 70a and 70b (which may be referred to as a "two-piece" gasket design). With respect to the illustrated embodiment, each one of the pair of conductive gaskets 70a and 70b may only be separated (or split) at one portion or position. With such an embodiment, conductive gasket 70a may be used in connection with both annular grooves 20a and 30a, and conductive gasket 70b may be used in connection with both annular grooves 20b and 30b. In embodiments, the separation or split associated with each conductive gasket 70a, 70b may be positioned to coincide with the portion of the coupler 10 that is open in an open configuration.

In embodiments, the conductive gasket may be non-metallic and may be comprised of a conductive material. In embodiments, the conductive gasket may be a compression-type gasket that may provide intimate compressive contact with an intended surface—which may include, for example and without limitation, a non-ferrule surface of a conveying member. With embodiments, a non-metallic conductive gasket may be comprised of a rubber, an elastomeric material, or a rubber and an elastomeric material. With embodiments, the non-metallic conductive gasket may include a sufficient amount of carbon, carbon nanotubes, and/or various other conductive filler(s). For some embodiments, the conductive gasket may be comprised of a composite material, which may include a sufficient amount of carbon to allow the material to meet an electrical conductivity requirement. Without limitation, embodiments of a conductive gasket may be comprised of a conductive rubber elastomer and/or may be comprised of impregnated conductive fibers or fillers. In an embodiment, a conductive gasket may be comprised of fluorosilicone rubber filled with silver plated aluminum. Additionally, with embodiments, coupler halves may be of composite material which may include sufficient amount of carbon, carbon nanotubes, and/or other conductive filler(s)—an example of which is commercialized under the trade name of Victrex PEEK90HMF40.

While two conductive gaskets are generally shown in connection with the drawing figures, it is possible that only one conduct gasket is utilized, or even that more than two conductive gaskets are utilized. Moreover, with different embodiments of a coupler, one or more conductive gaskets may be provided that have ends that are separated but push up or effectively meet one another. With other embodiments, one or more conductive gaskets may provide a continuous segment that extends up to about 350 degrees (or more) with respect to a circumference of a coupler.

Figure 9B:
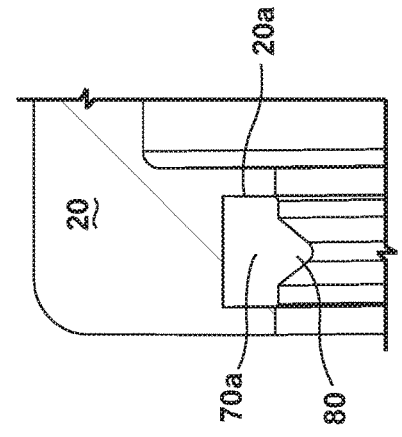
FIG. 9B is an enlarged view of a portion of the coupler half and conductive gasket generally illustrated in FIG. 9A.
Figure 9A:
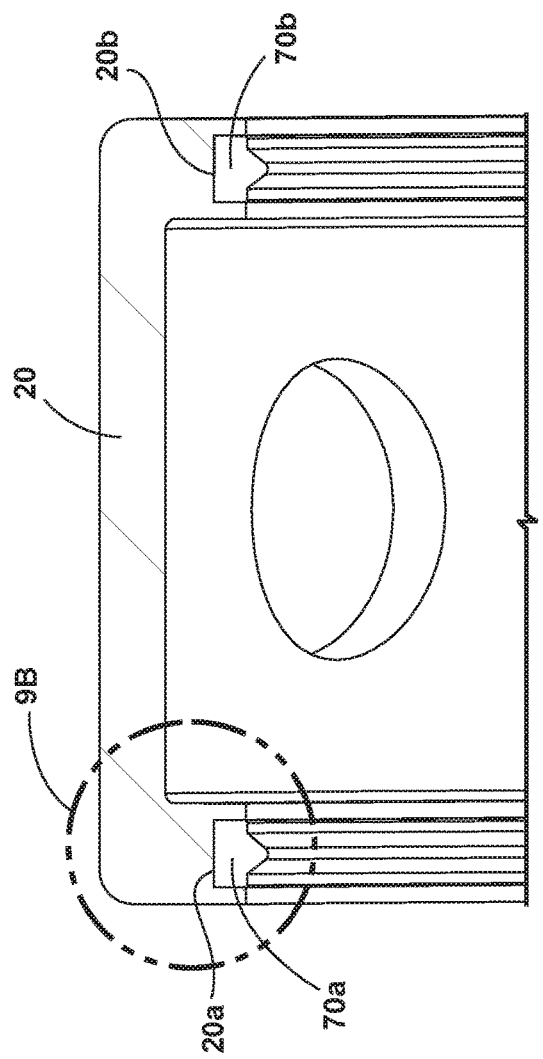
FIG. 9A is a perspective view of a portion of an embodiment of a coupler half and conductive gasket according to teachings of the present invention.
Figure 10:
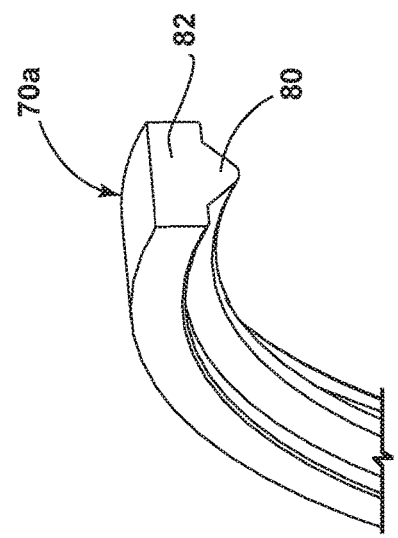
FIG. 10 is a perspective view of a portion of an embodiment of a conductive gasket, of the type generally illustrated in FIGS. 9A and 9B.

FIG. 9A generally illustrates an embodiment of a coupler half (e.g., 20) that includes a first conductive gasket 70a shown in connection with an annular groove (e.g., 20a) at a first end of the coupler half, and a second conductive gasket 70b shown in connection with an annular groove (e.g., 20b) at a second end of the coupler half. FIG. 9B shows an enlarged view of a portion of the coupler shown in FIG. 9A. As generally illustrated in FIG. 9A (as well as also illustrated in part in FIG. 9B), a portion of the conductive gasket 70a, 70b (e.g., portion 80) may extend radially inwardly beyond the inner radial portion/extent of the associated annular groove 20a, 20b of the coupler half 20. The portion of the conductive gasket 70a, 70b that extends radially inwardly beyond the extent of the inner radial portion/extent of the associated annular groove (e.g., portion 80) may be configured to contact a portion of a fluid conveying member (e.g., an annular flange). Moreover, the amount of such contact provided by the conductive gasket may be sufficient to provide an electrical conductivity path (or bridge) from the coupler half to an associated fluid conveying member. A configuration with a conductive gasket can, inter alia, provide a conductivity path between associated fluid conveying members and associated coupler halves.

Figure 11:
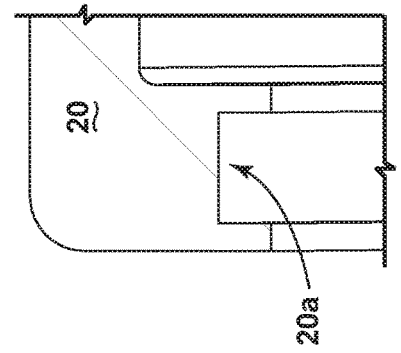
FIG. 11 is a perspective view of a portion of an embodiment of a coupler half, such as generally illustrated in FIG. 9B, shown without a conductive gasket.

An embodiment of a portion of a conductive gasket 70a is generally depicted in FIG. 9. The illustrated embodiment of a conductive gasket is shown having two unitary portions—a radially inner portion 80 and a radially outer portion 82. In an embodiment as generally shown, for example and without limitation, the radially inner portion 80 may have a generally triangular cross-sectional shape, and the radially outer portion 82 may have a generally rectangular cross-sectional shape. However, as those of skill in the art will readily understand, the present concept is not limited to conductive gaskets having a shape and configuration as shown in the figures, and the concept may utility conductive gaskets having various other sizes, shapes, and configurations. For example and without limitation, a conductive gasket may have a generally elliptical shape in cross section. In embodiments, such as illustrated in FIGS. 9A and 9B, the radially outer portion 82 of the conductive gasket 70a may substantially fill an associated cross-sectional area of the associated annular groove 20a. FIG. 11 generally illustrates a portion of an embodiment of a coupler half 20, such as generally illustrated in FIG. 9B, shown with an annular groove 20a and without a conductive gasket.

With embodiments of the present disclosure, a conductive gasket 70 may be disposed and retained in connection with an annular groove of a coupler half in various manners or ways. For example and without limitation, a conductive gasket (or portion thereof), e.g., 70a, may be provided inside an annular groove of a coupler half, e.g., 20a. With some embodiments, the conductive gasket may be press-fit (e.g., press fit on two or three sides). With other embodiments, the conductive gasket may be mechanically secured by some form of mechanical formation or mechanical attachment or device. In yet other embodiments, the conductive gasket may be secured by a conductive agent, which may comprise a bonding agent and/or glue. In other embodiments, the conductive gasket may be secured or retained using one or more of the foregoing configurations or methods.

With an embodiment of method of the present disclosure, since the conductive gasket are not required to be continuous (i.e., as the conductive gasket may have one or more separations or comprise separated segments), the conductive gasket may be connected to the coupler halves (at least partially disposed within a portion in the associated annular groove(s) of the coupler halves) prior to the coupler halves engaging and connecting the conveying members. Such a configuration with a conductive gasket that may be part of the coupler can contrast with the connection of an O-ring which would typically be connected over and to an end of a conveying member (e.g., in a ferrule on the conveying member) prior to use of a coupler to connect one conveying member to another conveying member.

Figure 12:
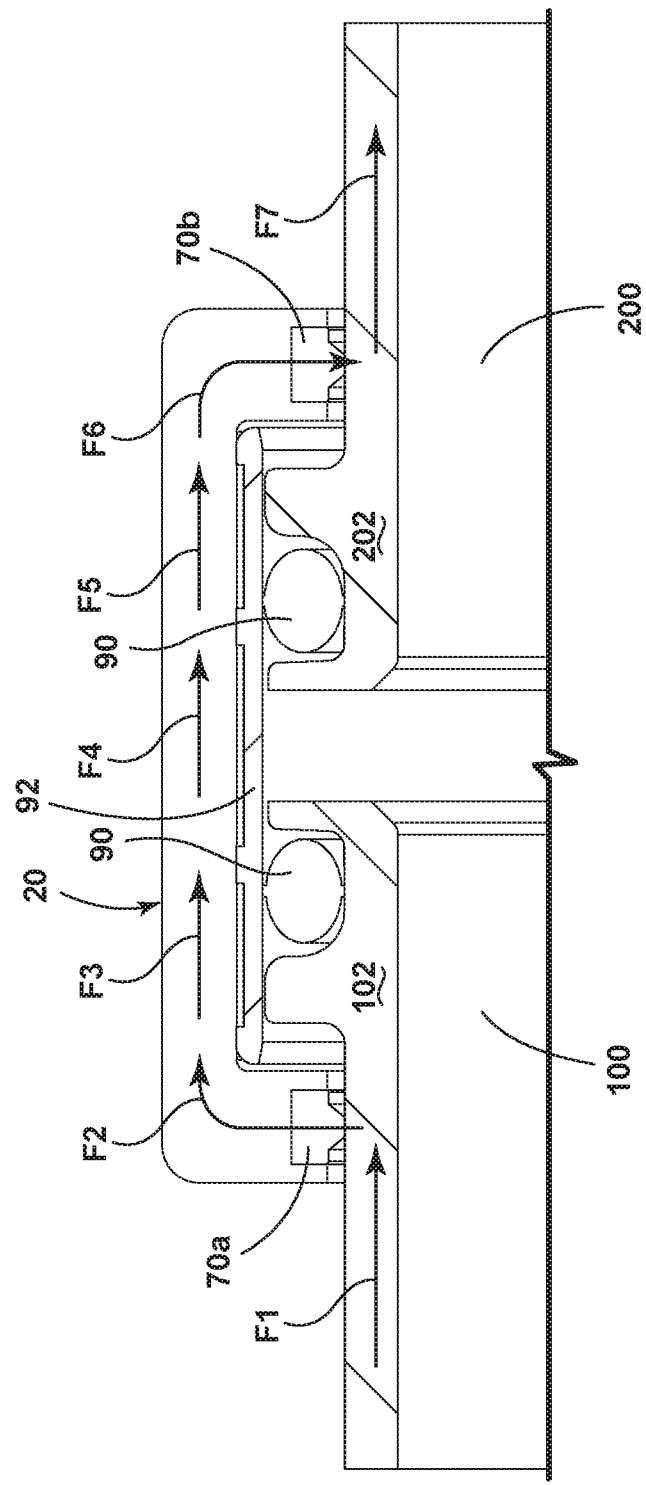
FIG. 12 is a cross-sectional representation of an embodiment of a coupler according to teachings of the present disclosure, generally illustrating an electrical conductivity path across the coupling.

FIG. 12 is a cross-sectional representation of a portion of an embodiment of a coupler generally illustrating an electrical conductivity path across the coupler and the coupling assembly (which includes the coupler and the coupled conveying members 100, 200). As generally illustrated in FIG. 12, conveying member 100 may include a portion 102, conveying member 200 may include a portion 202, and both portions 102 and 202 may be retained by/within a portion of coupler half 20 (such as when the coupler half of the coupler is in a closed configuration). As generally illustrated, a portion of a first conductive gasket 70a may be provided in an annular groove 20a at a first end of the coupler half 20, and a portion of a second conductive gasket 70b may be provided in an annular groove 20b at a second end of the coupler half 20. In embodiments, the conductive gasket 70a, 70b does not extend longitudinally beyond the longitudinal extent of the coupler 10. Further, as also generally illustrated in FIG. 12, a portion of a conductive gasket (e.g. radially outer portion 820 (see, e.g., FIG. 9)) may be disposed to provide intimate compressive contact with a surface of a conveying member 100, 200. Such surface of the conveying member 100, 200 may be a surface that is provided longitudinally past a ferrule associated with such conveying member 100, 200.

Additionally, in embodiments, the coupling assembly may include one or more seals (such as O-rings 90) and/or a sleeve 92 (which may be annular and may be provided between a portion of the coupler half 20 and portions (e.g., portions 102 and/or 202) of the fluid conveying members 100, 200. Examples of O-rings 90 that may be included and may provide sealing are shown in FIG. 12—with the O-rings 90 included within ferrules (radially extending, generally U-shaped portions) provided at or about the ends of the conveying members 100, 200. Such O-rings 90 may be substantially continuous (a full 360 degrees without separation), may be provided in the ferrules prior to the connection of the coupler 10 to the conveying members 100, 200, may be configured to provide sealing between the connected components, and/or may not provide or be part of an intended conductive path.

With embodiments, as generally illustrated by flow arrows (arrows F1 through F7) shown in FIG. 9, an electrical conductivity path may be provided across the coupler (and coupling assembly). In the depicted path, an electrical charge may be dissipated from a portion 102 of a first fluid conveying member 100, through a first conductive gasket 70a, through a coupler half 20, through a second conductive gasket 70b, and on to a portion 202 of a second fluid conveying member 200. With such a configuration an electrostatic charge may be conducted from one fluid conveying member to another/connected fluid conveying member.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A coupler for connecting a first fluid conveying member and a second fluid conveying member, the coupler comprising:
   a first coupler half;
   a second coupler half; and
   a conductive gasket comprising non-metallic material;
   wherein at least one of the first coupler half and the second coupler half include a groove configured to receive at least a portion of the conductive gasket, the groove forming part of an annular groove of the coupler; the first coupler half and the second coupler half are configured to connect and circumferentially surround portions of said first and second fluid conveying members; the conductive gasket provides a portion of a conductivity path from a first end of the coupler to a second end of the coupler; the conductive gasket has a radially outer portion that is positioned in the annular groove of the coupler and a radially inner portion that extends radially inward from the radially outer portion; and the conductive gasket contacting, via the radially inner portion, a non-ferrule surface of a respective one of the first fluid conveying member or the second fluid conveying member along an entire circumferential length of the conductive gasket.

2. The coupler of claim 1, including a hinge configured to connect the first coupler half and the second coupler half.

3. The coupler of claim 1, including a latch configured to connect the first coupler half and the second coupler half.

4. The coupler of claim 1, wherein the first coupler half and the second coupler half are comprised of conductive composite material or metal.

5. The coupler of claim 1, wherein the first coupler half and the second coupler half each include a respective groove configured to receive at least a portion of the conductive gasket.

6. The coupler of claim 1, wherein the conductive gasket includes a first conductive gasket provided at or about the first end of the coupler, and a second conductive gasket provided at or about the second end of the coupler.

7. The coupler of claim 6, wherein the first conductive gasket is configured to contact a portion of said first fluid conveying member to provide a first conductivity path from the first fluid conveying member to the first end of the coupler, and the second conductive gasket is configured to contact a portion of said second fluid conveying member to provide a second conductivity path from the second end of the coupler to said second fluid conveying member.

8. The coupler of claim 6, wherein at least one of the first conductive gasket and the second conductive gasket is comprised of a plurality of separated segments.

9. The coupler of claim 1, wherein the first coupler half includes a first number of apertures, and the second coupler half includes a second number of apertures, wherein the first number is different than the second number.

10. The coupler of claim 1, wherein the conductive gasket is comprised of a fluorosilicone rubber filled with silver plated aluminum.

11. The coupler of claim 10, wherein the conductive gasket includes conductive fibers or fillers.

12. The coupler of claim 1, wherein the conductive gasket is comprised of carbon.

13. The coupler of claim 1, wherein the radially outer portion has a rectangular cross-sectional shape, and the radially inner portion has a triangular cross-sectional shape.

14. The coupler of claim 1, wherein the conductive gasket has a square or rectangular portion that is configured to fit within the annular groove of the coupler, and a triangular contact portion that extends radially inward from the annular groove.

15. The coupler of claim 1, wherein the conductive gasket is mechanically attached or connected to the coupler.

16. The coupler of claim 1, wherein the conductive gasket is attached or connected to the coupler via a conductive agent.

17. The coupler of claim 16, wherein the conductive agent comprises a bonding agent or glue.

18. The coupler of claim 1, wherein the conductive gasket is a ring shape with an opening defining two ends.

19. The coupler of claim 1, wherein the coupler is configured to compress both a non-conductive gasket which circumferentially surrounds ferrule portions of the first and second fluid conveying members and the conductive gasket.

20. The coupler of claim 19, wherein the non-conductive gasket and the conductive gasket have different cross-sectional shapes.

21. The coupler of claim 20, wherein the radially outer portion of the conductive gasket has a rectangular cross-sectional shape, and the radially inner portion has a triangular cross-sectional shape and the non-conductive gasket has a circular cross-sectional shape.

22. The coupler of claim 1, wherein the conductive gasket contacts only the annular groove of the coupler and the first or second fluid conveying member.

23. The coupler of claim 1, wherein the conductive gasket is comprised of a first portion carried with the first half of the coupler and a second portion carried with the second half of the coupler when the coupler moves between an open and a closed position.

24. The coupler of claim 23, wherein the first and second portions are separated segments.

25. The coupler of claim 23, wherein the first and second portions are connected at a first end and separated at a second end.

* * * * *